United States Patent

[11] 3,586,290

| [72] | Inventor | Robert A. Null |
| | | Tempe, Ariz. |
| [21] | Appl. No. | 836,357 |
| [22] | Filed | June 25, 1969 |
| [45] | Patented | June 22, 1971 |
| [73] | Assignee | The Garrett Corp. |
| | | Los Angeles, Calif. |

[54] VALVE
8 Claims, 3 Drawing Figs.

[52] U.S. Cl. .................................................. 251/306,
 277/161
[51] Int. Cl. ............................................. F16k 1/228,
 F16j 9/06
[50] Field of Search ........................................ 277/39,
 158, 160, 161; 251/85, 173, 305—308

[56] References Cited

UNITED STATES PATENTS

| 1,671,069 | 5/1928 | DeWein | 251/305 X |
| 1,773,250 | 8/1930 | Amberg | 277/161 |
| 2,092,086 | 9/1937 | Saharoff | 277/160 |
| 2,170,970 | 8/1939 | Johnston | 277/161 |
| 2,433,839 | 1/1948 | Ferguson et al. | 277/39 |
| 2,907,548 | 10/1959 | Mass et al. | 251/85 |
| 3,399,863 | 9/1968 | Fawkes | 251/306 |

FOREIGN PATENTS

| 74,421 | 7/1918 | Austria | 277/158 |

*Primary Examiner*—Henry T. Klinksiek
*Attorneys*—Herschel C. Omohundro and John N. Hazelwood

ABSTRACT: This butterfly valve has a sealing ring expander on the side which is disposed upstream when the valve is open to resist movement of the sealing ring toward the downstream side and thus reduces the torque required to close the valve.

INVENTOR.
ROBERT A. NULL

VALVE

SUMMARY

This invention relates to valves and more particularly to butterfly-type valves. Still more specifically, the invention relates to sealing means for butterfly valves.

It has been discovered that butterfly valves provided with substantially conventional split sealing rings require excessive torque to effect closure and wear excessively due to the movement of the sealing ring toward the downstream side of the open valve. It should be apparent that the groove for the sealing ring of a butterfly valve must be deep enough to accommodate the ring when the valve disc is in a closed position. Such sealing rings are resilient and when the valve disc is moved toward an open position the rings expand. After the disc reaches an open position the upstream pressure causes the ring to move into the groove therefor on the upstream edge of the disc. This movement disposes the ring at the opposite edge an excessive distance beyond the edge of the disc and when the valve is turned toward a closed position the edge of the sealing ring digs into the sidewall of the valve body. Extra torque force is then required to complete the closing movement. Since the ring digs in, there is a tendency for the ring to distort and/or scrape material from the passage wall. If the ring is of softer material than the wall it may be unduly worn. In any event, some part of the valve is subject to premature wear or destruction.

One of the objects of this invention is to provide a valve which will overcome the above-mentioned disadvantages by eliminating the cause of premature wear. This object is attained by providing a butterfly valve with a sealing ring expander on the side or edge of the butterfly which will be disposed upstream when the valve is open. This expander will resist movement of the sealing ring by the fluid pressure and the tendency of the seal to dig into the passage wall will be avoided.

Another object of this invention is to construct the ring expander mentioned in the preceding paragraph from strip material and to shape it so that a plurality of reversely directed angles will be provided whereby the expander will alternately engage the bottom of the ring groove and the inner side of the ring to exert an outward force thereon.

It is also an object of this invention to employ the expander previously mentioned at the edge of the valve which is upstream of the valve pivot when the valve is opened. The expander will thus resist the force of the upstream pressure and prevent the sealing ring from being pushed an excessive extent from the ring groove on the opposite edge of the butterfly.

An object also is to form the groove with recesses or notches and to include inturned or hooklike end portions to enter the notches and retain the expander in place.

Other objects will be made apparent by the following description of one form of the invention which has been illustrated in detail in the accompanying drawing.

THE DRAWING

Figure 1:
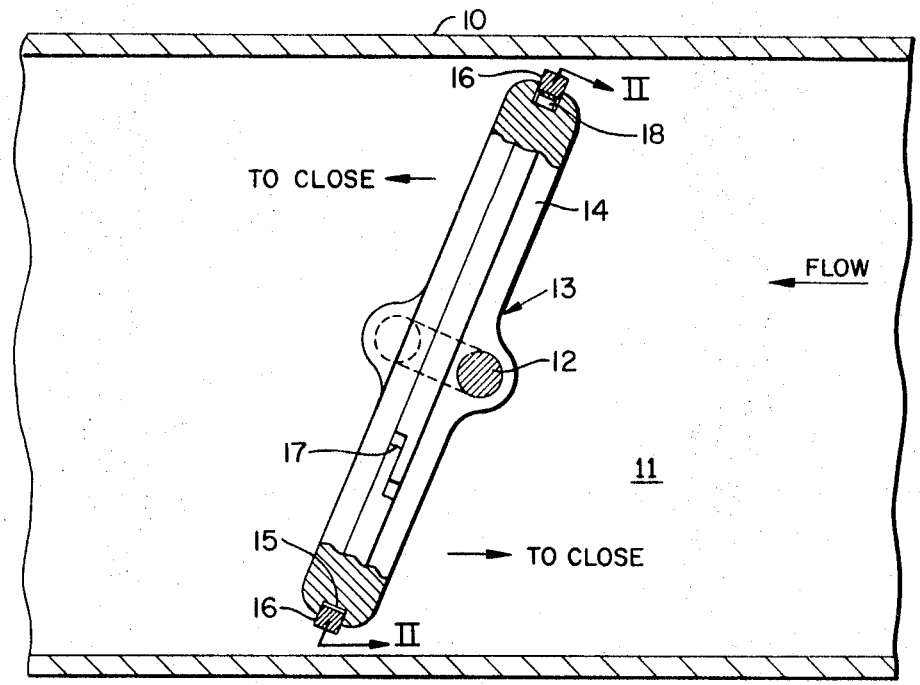
FIG. 1 is an axial sectional view of a butterfly valve embodying the invention.

More particular reference to the drawing shows that the valve to which the invention is adapted includes a body 10 forming a fluid passage 11. The body has a shaft 12 journaled for rotary movement in suitable bearings, shaft 12 extending transversely of the passage at a slight angle so that the valve may be provided with a continuous sealing element. Fluid flow through the passage 11 is controlled by a butterfly valve designated generally by the numeral 13, this valve having a disclike body 14 secured for pivotal movement with the shaft 12, the valve being movable between open and closed positions. In the latter position the valve extends transversely of the passage. In the fully open position the center plane of the valve disc will be disposed substantially on the axial center of the passage. To secure a better seal between the edge of the butterfly disc and the passage wall, the disc is provided with a groove 15 in the edge. This groove extends completely around the disc and is provided to receive a sealing ring 16. This ring may be of the split type, as indicated at 17, and is formed of resilient material, the normal diameter of the ring being slightly greater than the diameter of the passage. The ring will thus frictionally engage the passage wall and be slightly contracted due to the engagement with the wall as the disc is moved into the closed position.

Figure 3:
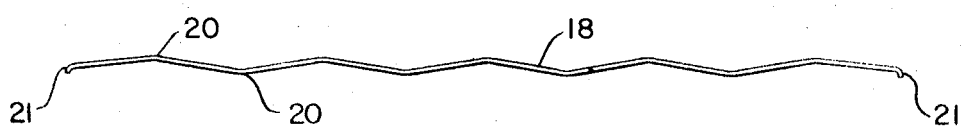
FIG. 3 is a side elevational view of a balance spring or expander used in the valve shown in FIG. 1.

As pointed out in the objects, the tendency of the ring to expand will cause it to engage the wall before the valve is completely closed, continued closing movement serving to force the ring into its contracted state. Heretofore, the fluid pressure in the passage at the upstream side of the valve would force the ring into the groove on the upstream side and outwardly of the groove on the downstream side. Due to this relative movement, more of the ring would be exposed on one side than the other and closing movement would cause the ring to dig into the passage wall. Undue wear would result. Either the seat for the ring would be worn, or the ring itself, or both might be worn. To avoid this difficulty, the balance spring or expander 18 of the present invention has been provided. This expander, as shown in FIG. 3, is formed of thin, resilient strip material, and at uniformly spaced points is reversely bent to provide a series of slight corners 20 on opposite sides of the strip. This strip is placed in the groove for the sealing ring so that it will tend to force the ring outwardly of the groove.

Figure 2:
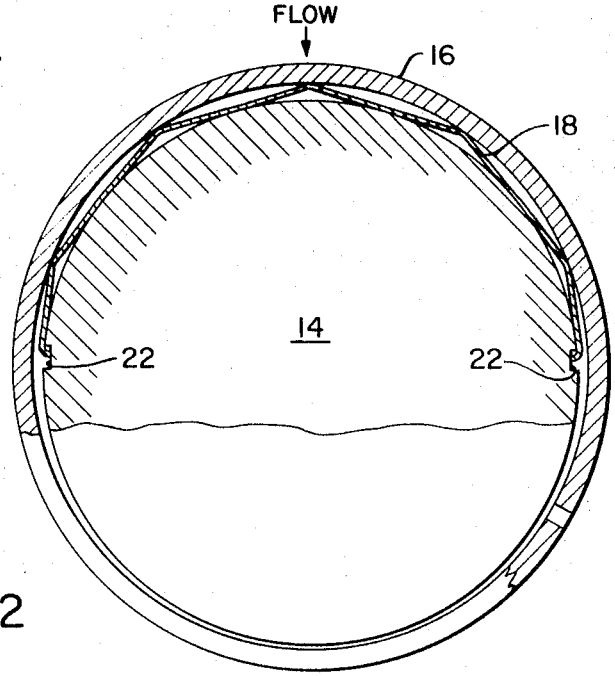
FIG. 2 is a detail sectional view taken through the butterfly of the valve in FIG. 1 on the plane indicated by the line II–II of this figure.

From FIG. 2 it will be noted that the balance spring or expander 18 extends only halfway around the disc body. To retain the expander in place, the opposite ends are bent, as at 21, to provide some hooklike portions which engage in recesses 22 formed in the bottom wall of the ring groove. It may be necessary to increase the groove slightly on the side of the disc to which the expander is applied. It will also be noted that this particular side is arranged to move into the passage on the upstream side of the butterfly pivot. When the valve is moved to the open position, the sealing ring will be exposed to the upstream fluid pressure which will tend to move the sealing ring in opposition to the force of the balance spring or expander.

The material for the expander is selected to provide the proper strength to resist excessive movement of the sealing ring in response to the fluid pressure. By proper calculation, the ring may be permitted to move to a position which would be substantially concentric with the disc and equal engagement of the ring with the passage wall on both sides of the butterfly will be secured. Uniform wear on the sealing ring or seat therefor will then result.

I claim:

1. A valve mechanism comprising:
   a. housing means providing a fluid passage;
   b. closure means for controlling fluid flow through said passage having a body supported for pivotal movement between passage-closing and opening positions, said body forming a groove for a seal member;
   c. seal means relatively loosely supported in said groove and engaging the wall of the passage during closing movement of said body to effect a seal between the passage wall and said body; and
   d. resilient means engaging said body and said seal means and tending to urge the seal means outwardly of the groove on the upstream side of the body only when the closure body is in a passage-opening position to oppose movement of said seal means into said groove by upstream fluid pressure.

2. The valve mechanism of claim 1 in which said resilient means is an expander disposed on the upstream side only of said closure body when such body is in a passage-opening position.

3. The valve mechanism of claim 2 in which said passage has a circular cross section, said closure body is of disc shape, and said seal means is a split resilient ring having a tendency to expand upon disengagement from the passage wall.

4. The valve mechanism of claim 3 in which the expander means between the closure body and seal means is a spring element extending substantially half the distance around the periphery of said closure body.

5. The valve mechanism of claim 4 in which the expander means is of resilient strip material.

6. The valve mechanism of claim 5 in which the expander means is shaped to alternately engage the bottom wall of the groove in said closure means and the inner surface of said seal means.

7. The valve mechanism of claim 5 in which the expander means is provided with a plurality of reversely bent corner portions for alternate engagement with the bottom wall of the groove in said closure means and the inner surface of said seal means.

8. The valve mechanism of claim 5 in which the closure body is provided at predetermined locations with recesses and said expander means has portions shaped for disposition in said recesses to retain said expander means on said closure body.